Aug. 12, 1924.
J. E. HALE
1,504,689
VEHICLE WHEEL
Filed Sept. 19, 1921
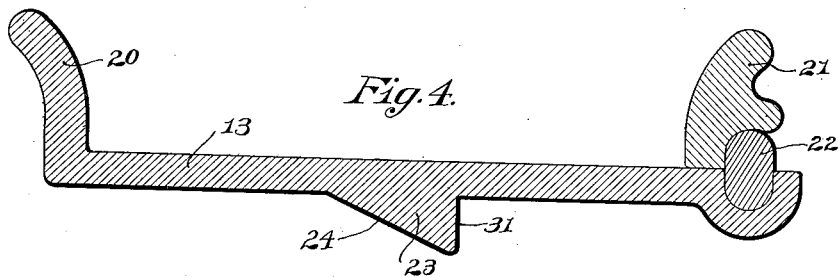
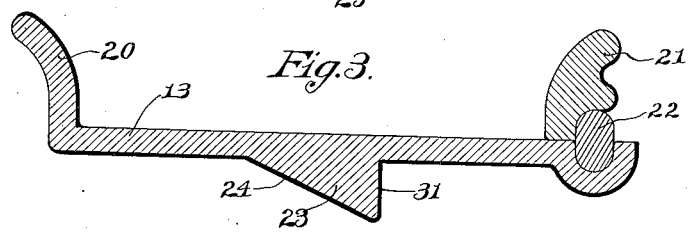
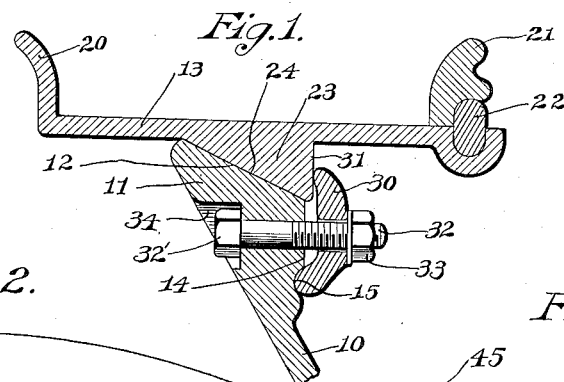
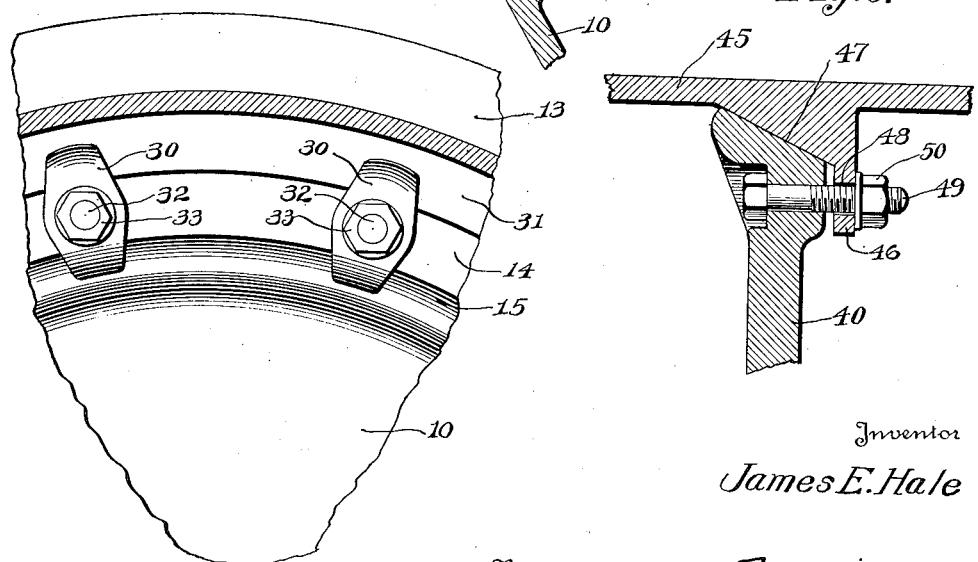
Inventor
James E. Hale
By R. J. Trogner
Attorney Patented Aug. 12, 1924.

1,504,689

UNITED STATES PATENT OFFICE.

JAMES E. HALE, OF AKRON, OHIO, ASSIGNOR TO THE GOODYEAR TIRE & RUBBER COMPANY, OF AKRON, OHIO, A CORPORATION OF OHIO.

VEHICLE WHEEL.

Application filed September 19, 1921. Serial No. 501,662.

*To all whom it may concern:*

Be it known that I, JAMES E. HALE, a citizen of the United States, residing at Akron, in the county of Summit and State of Ohio, have invented new and useful Improvements in Vehicle Wheels, of which the following is a specification.

My invention relates to vehicle wheels and it has particular reference to an improved form of vehicle wheel and demountable rim.

The object of my invention is to provide a vehicle wheel having improved operating characteristics of inexpensive manufacture and so constructed that a single size of wheel is adapted to receive any width of tire rim.

Fig. 1 of the accompanying drawings is a transverse sectional view of a portion of a vehicle wheel constructed in accordance with my invention;

Fig. 2 is a side sectional view of the wheel shown in Fig. 1, taken substantially on the line II—II and looking in the direction of the arrows;

Figs. 3 and 4 are transverse sectional views of tire rims adapted to be mounted on the vehicle wheel shown in Fig. 1; and Fig. 5 is a fragmentary sectional view of a modified form of vehicle wheel and tire rim manufactured in accordance with my invention.

Referring particularly to Figs. 1 to 4, inclusive, the vehicle wheel there shown embodies a wheel portion 10 that is preferably of the well known disk type. The wheel has a materially thickened peripheral edge 11 which is shaped to provide a frusto-conical bearing surface 12 on which a demountable tire rim 13 is secured. The side surface 14 of the wheel is substantially in alignment with the plane of the wheel and terminates in a clamp-seating depression 15.

The rim structure shown in the drawings embodies a pair of tire retaining flanges 20 and 21 of conventional form. The flange 21 is removably secured in place by a lock ring 22. The base of the rim has a circumferential supporting rib 23 formed on its inner surface. This rib terminates in a frusto-conical supporting surface 24 which is adapted to engage the cooperating wheel surface 12 to mount the rim in place. The circumferential rib 23 is of the same width and form for every width of tire rim, as indicated by Figures 3 and 4 of the drawing. Any width of tire rim may, therefore, be mounted on one size of wheel.

The demountable rim 13 is held in place on the wheel 10 by means of a plurality of clamps 30 that engage a shoulder 31 of the rib 23 and seat in the depression 15 of the wheel. Each of the clamps 30 fits loosely around a bolt 32 and is secured in place by a nut 33 in the conventional way. Each of the bolts 32 extends through an opening provided in the thickened portion of the wheel. The heads 32' of each of the bolts seats in a socket 34 that is provided in the thickened portion of the wheel.

Fig. 5 is a sectional view of a modified form of my invention in which the clamping member is a portion of the demountable tire rim. The wheel 40 is substantially the same as the wheel illustrated and described in conjunction with Figs. 1 and 2 of the drawing. In this particular form of vehicle wheel, the demountable rim 45 has a radial flange 46 that extends from the shoulder of a circumferential rim-seating rib 47. The flange 46 has a series of openings 48 for receiving clamping bolts 49. A series of nuts 50 for the bolts 49 serve to hold the rim in place.

This form of demountable rim is particularly convenient in view of the facility with which the rim may be removed and also in view of the small number of removable parts.

Although I have illustrated and described only a few modifications of my invention as it has been reduced to practice, I desire to protect all forms thereof and to this end have submitted the appended claims. Only such limitations should be imposed on my invention as are set forth in the claims.

What I claim is:

1. A vehicle wheel comprising a demountable tire rim having a centrally located frusto-conical supporting surface, a wheel embodying a disk portion with a substantially thickened peripheral portion, said peripheral portion having a frusto-conical surface adapted to cooperate with the corresponding surface of the tire rim, and clamping means associated with the wheel portion embodying a plurality of clamping members each of which is adapted to seat below the thickened portion of the wheel and to engage a lateral surface of the tire rim, and a bolt disposed intermediate the seating surfaces of the clamp for operating each of the clamps.

2. A vehicle wheel comprising a disk portion having a materially thickened peripheral section, the outer face of which constitutes a supporting surface for a tire rim, a tire rim having a centrally located supporting surface adapted to engage the corresponding surface of the disk, a plurality of clamping means for securing the tire rim to the disk each embodying a clamping member adapted to seat on a lateral face of said tire rim and to engage the disk radially inward from the substantially thickened portion, and a bolt extending through the thickened portion of said tire rim for securing each of the clamping members in place.

3. In a vehicle wheel, the combination with a disk terminating in a materially thickened peripheral portion shaped to provide a single frusto-conical tire rim supporting portion, of a tire rim having a single frusto-conical tire supporting surface adapted to seat on the corresponding surface of the disk, and a plurality of clamping means for securing said tire rim to said disk, each of said clamping means embodying a clamping member adapted to bridge the thickened peripheral portion of the disk and to seat on the disk and a lateral face of the tire rim and having a bolt extending through the thickened portion and the clamping member.

In witness whereof I have hereunto signed my name in the presence of two subscribing witnesses.

JAMES E. HALE.

Witnesses:
J. E. KEATING,
B. J. McDANEL.